United States Patent
Yao et al.

(10) Patent No.: US 8,509,233 B2
(45) Date of Patent: Aug. 13, 2013

(54) METHOD AND APPARATUS FOR REQUESTING MULTICAST, PROCESSING AND ASSISTING MULTICAST REQUEST

(75) Inventors: Chunyan Yao, Shanghai (CN); Jianbin Chen, Shanghai (CN); Haibo Wen, Shanghai (CN); Fanxiang Bin, Shanghai (CN); Jun Zheng, Tianjin (CN)

(73) Assignee: Alcatel Lucent, Paris (FR)

( * ) Notice: Subject to any disclaimer, the term of this patent is extended or adjusted under 35 U.S.C. 154(b) by 240 days.

(21) Appl. No.: 13/003,399

(22) PCT Filed: Jun. 1, 2009

(86) PCT No.: PCT/CN2009/072063
§ 371 (c)(1),
(2), (4) Date: Jan. 10, 2011

(87) PCT Pub. No.: WO2010/139109
PCT Pub. Date: Dec. 9, 2010

(65) Prior Publication Data
US 2011/0128956 A1    Jun. 2, 2011

(51) Int. Cl.
*H04L 12/28* (2006.01)
(52) U.S. Cl.
USPC .......................................... 370/390; 370/392
(58) Field of Classification Search
None
See application file for complete search history.

(56) References Cited

U.S. PATENT DOCUMENTS

| | | | |
|---|---|---|---|
| 7,346,053 B1 * | 3/2008 | Leung et al. | 370/390 |
| 7,630,370 B2 * | 12/2009 | Deshpande et al. | 370/390 |
| 7,940,765 B2 * | 5/2011 | Rao et al. | 370/390 |
| 8,218,545 B2 * | 7/2012 | Paila et al. | 370/390 |
| 8,228,812 B2 * | 7/2012 | Lee et al. | 370/252 |
| 2005/0190765 A1 * | 9/2005 | Gotoh et al. | 370/390 |
| 2006/0268869 A1 * | 11/2006 | Boers et al. | 370/390 |
| 2007/0127473 A1 | 6/2007 | Kessler et al. | |
| 2007/0147374 A1 | 6/2007 | Lee et al. | |
| 2009/0245248 A1 * | 10/2009 | Arberg et al. | 370/390 |
| 2010/0061369 A1 * | 3/2010 | Suzuki | 370/390 |
| 2010/0172353 A1 * | 7/2010 | Fernandez Gutierrez | 370/390 |

FOREIGN PATENT DOCUMENTS

| | | |
|---|---|---|
| CN | 1503507 A | 6/2004 |
| CN | 1992627 A | 7/2007 |
| CN | 101442564 A | 5/2009 |

OTHER PUBLICATIONS

International Search Report.

* cited by examiner

*Primary Examiner* — Michael J Moore, Jr.
(74) *Attorney, Agent, or Firm* — Harness, Dickey & Pierce (57) ABSTRACT

According to at least one particular embodiment of the present invention, in an ASM-based RP, when the RP receives a multicast transmission request from a multicast source, it processes said multicast transmission request of the multicast source according to the multicast transmission request and remaining resources available for multicast forwarding in the RP. When using the methods and apparatuses provided in the present invention, by means of reasonable controls on the multicast transmission request conducted by the RP according to its resource situation, the hardware processing loads and the port traffic load of RP can be effectively maintained within an appropriate range, thereby avoiding resource exhaustion, and the disadvantageous impact of new multicast services on the existing services can be also avoided.

13 Claims, 10 Drawing Sheets

METHOD AND APPARATUS FOR REQUESTING MULTICAST, PROCESSING AND ASSISTING MULTICAST REQUEST

FIELD OF THE INVENTION

The present invention relates to the field of multicast, and more particularly relates to the method and apparatus for requesting to transmit multicast data in an Any-Source Multicast (ASM)-based multicast source, to the method and apparatus for processing a corresponding multicast transmission request at Rendezvous Point (RP), and to the method and apparatus for assisting the interactions between a RP and a multicast source in a forwarding device.

BACKGROUND OF THE INVENTION

Different from LP unicast, the destination address of LP multicast is a group address ranging from 224.0.0.0 to 239.255.255.255, also called class D address. It is sort of temporary address that is dynamically allocated and restored. Every multicast group corresponds to a dynamically allocated class D address. When the multicast of a multicast group ends, the corresponding class D address is recycled for later multicast.

In order to implement multicast data packet forwarding in a real network, all interconnected devices have to run an interoperable multicast routing protocol. Multicast routing protocols are divided into: internet group management protocol (IGMP), dense mode protocol (e.g. DVMRP, PIM-DM), sparse mode protocol (e.g. PIM-SM, CBT) and link state routing protocol (MOSPF).

Wherein, the key to multicast routing is to establish a multicast tree for each multicast group, which varies from one to another according to different multicast protocols. Currently, there are two multicast tree construction techniques: source multicast tree and shared tree.

Source multicast tree is a multicast tree that is constructed from multicast sources, suitable for the cases where multicast sources are dense and the amount of multicast data is large.

Shared tree is a multicast tree that is constructed through a RP to each member of a multicast group, where multicast sources transmit the related information to the RP for multicasting. Shared tree is suitable for the cases where multicast sources are sparse and the amount of multicast data is small, so as to reduce the cost for routing information exchange of routers. Currently, the popular sparse mode multicast routing protocol is the PIM-SM (Protocol-Independent Multicast-Sparse Mode) protocol in sparse mode.

SUMMARY OF THE INVENTION

The present invention is proposed based on the reorganization to the following technical problems:

A multicast address is, after the negotiation of multicast sources and operators, allocated by a dedicated server such as DHCP server, and it is unknown to a multicast source whether the multicast address is also being used by other multicast sources. But in an ASM based multicast scheme, different multicast groups share the same multicast tree (also called shared tree), where a RP, as the root node of the multicast tree, is in charge of the task of forwarding multicast data to the branches and leaves for these multicast groups. If the RP does not control multicast transmission requests of the multicast sources but simply admits the transmission after receiving a multicast transmission request, its limited multicast forwarding capability can perhaps hardly afford heavier loads, so that due to the joining of new multicast sources or new multicast services, the data packet forwarding of the multicast services that have been carried out normally is hindered, which affects the user experience.

According to at least one embodiment of the present invention, in an ASM-based RP, when receiving a multicast transmission request from a multicast source; the RP processes the multicast transmission request of the multicast source according to the multicast transmission request and the remaining forwarding resources in the RP.

Wherein, the multicast forwarding capability includes hardware processing capability, network transmission capability etc. Specifically, the network transmission capability can be reflected by the number of affordable multicast sources, the number of multicast services or the total bandwidth.

As the multicast transmission request can carry the description of a forthcoming multicast service, for example the bandwidth requirement, the type of service etc., the RP can process the request based on the allocable bandwidth.

Wherein, the RP can control the bandwidth corresponding to each multicast group separately, and after a multicast group runs out of bandwidth it can occupy, new multicast transmission requests pointing to the multicast group are no longer admitted, even if there is available bandwidth pre-allocated to other multicast groups.

Optionally, each multicast group can share a total multicast bandwidth in the RP, i.e. when the service of a multicast group is busy, the multicast group can occupy a large amount of the total bandwidth, and other lightly loaded multicast groups only occupy a small amount of the remaining bandwidth according to their requirements. After the end of a multicast service, the corresponding bandwidth is released for a succeeding multicast transmission request, no matter which particular multicast group the multicast transmission request is pointing to.

Optionally, the RP can be configured to have an upper limit of the number of multicast sources for each multicast group, so that when the number of multicast sources that are forwarding multicast data to a multicast group reaches this upper limit, new requests for transmitting multicast data to the multicast group are rejected.

Optionally, the RP can be configured to have a total upper limit of the number of multicast sources for all multicast groups, so that when the number of the multicast sources for which it is forwarding multicast data reaches this upper limit, any new multicast transmission request is rejected.

According to a first aspect of the present invention, there is provided a method, in a RP based on ASM, for processing a multicast transmission request of a multicast source, comprising the following steps: Receiving the multicast transmission request from said multicast source, for requesting to transmit multicast data to at least one multicast address; processing said multicast transmission request of the multicast source according to said multicast transmission request and remaining multicast forwarding resources in said RP.

According to a second aspect of the present invention, there is provided a method, in a forwarding device based on ASM, for assisting signaling interactions between a RP and a multicast source, comprising: receiving a multicast transmission request coming from said multicast source and indicating at least one multicast address; for each of said at least one multicast address, requesting, in place of said multicast source, a RP that corresponds to the multicast address to transmit multicast data to the multicast address.

According to a third aspect of the present invention, there is provided a method, in a multicast source based on ASM, for requesting transmitting multicast data, comprising: generating the unicasting multicast transmission request which indicates at least one multicast address; transmitting said multicast request to a forwarding device or RP that corresponds to said at least one multicast address.

According to a fourth aspect of the invention, there is provided a method, in a multicast source based on ASM, for requesting transmitting multicast data, comprising: generating a multicasting multicast transmission request which indicates a multicast address, representing that the multicast source requests to transmit multicast data to the multicast address; transmitting the multicasting multicast transmission request to the multicast address.

According to a fifth aspect of the invention, there is provided a first apparatus in a RP based on ASM for processing a multicast transmission request of a multicast source, comprising: a first receiving means, for receiving the multicast transmission request from said multicast source, and for requesting to transmit multicast data to at least one multicast address; a processing means, for processing the multicast transmission request of the multicast source according to said multicast transmission request and remaining multicast forwarding resources in said RP.

According to a sixth aspect of the invention, there is provided a second apparatus in a forwarding device based on ASM, for assisting signaling interactions, between a RP and a multicast source, comprising: a second receiving means, for receiving a multicast transmission request from said multicast source, which indicates at least one multicast address; a requesting means, for requesting, in place of said multicast source, a RP corresponding to the multicast address to transmit multicast data to the multicast address for each of said at least one multicast address.

According to a seventh aspect of the invention, there is provided a third apparatus in multicast source based on ASM, for requesting transmitting multicast data, which comprises: a first generating means, for generating a unicasting multicast transmission request, which indicates at least one multicast address; a second transmitting means, for transmitting said multicast request to a forwarding device or RP corresponding to said at least one multicast address.

According to an eighth aspect of the invention, there is provided a fourth apparatus in a multicast source based on ASM, for requesting transmitting multicast data, which comprises: a second generating means, for generating a multicasting multicast transmission request which indicates a multicast address, representing that the multicast source requests to transmit multicast data to the multicast address; a third transmitting means, for transmitting the multicast request of the multicast source to the multicast address.

When using the methods and apparatuses provided by the present invention, by means of reasonable controls on multicast transmission requests conducted by the RP according to the situation of its resources, the hardware processing load and the port traffic load of the RP can be effectively maintained within an appropriate range, thereby avoiding resource exhaustion, and the disadvantageous impact of new multicast services on the existing or important services can be also avoided, thereby guaranteeing the users' service experience.

BRIEF DESCRIPTION OF THE DRAWINGS

Other features and advantages of the present invention will become more apparent from the following detailed description of the non-limiting embodiments taken in conjunction with the accompanying drawings. Wherein, the identical or similar reference signs indicate the identical or similar procedure features or apparatus (module) features.

DETAIL DESCRIPTION OF EMBODIMENTS

Each non-limiting embodiments of the present invention will be described in detail in conjunction with the accompanying drawings in the following.

Figure 1:
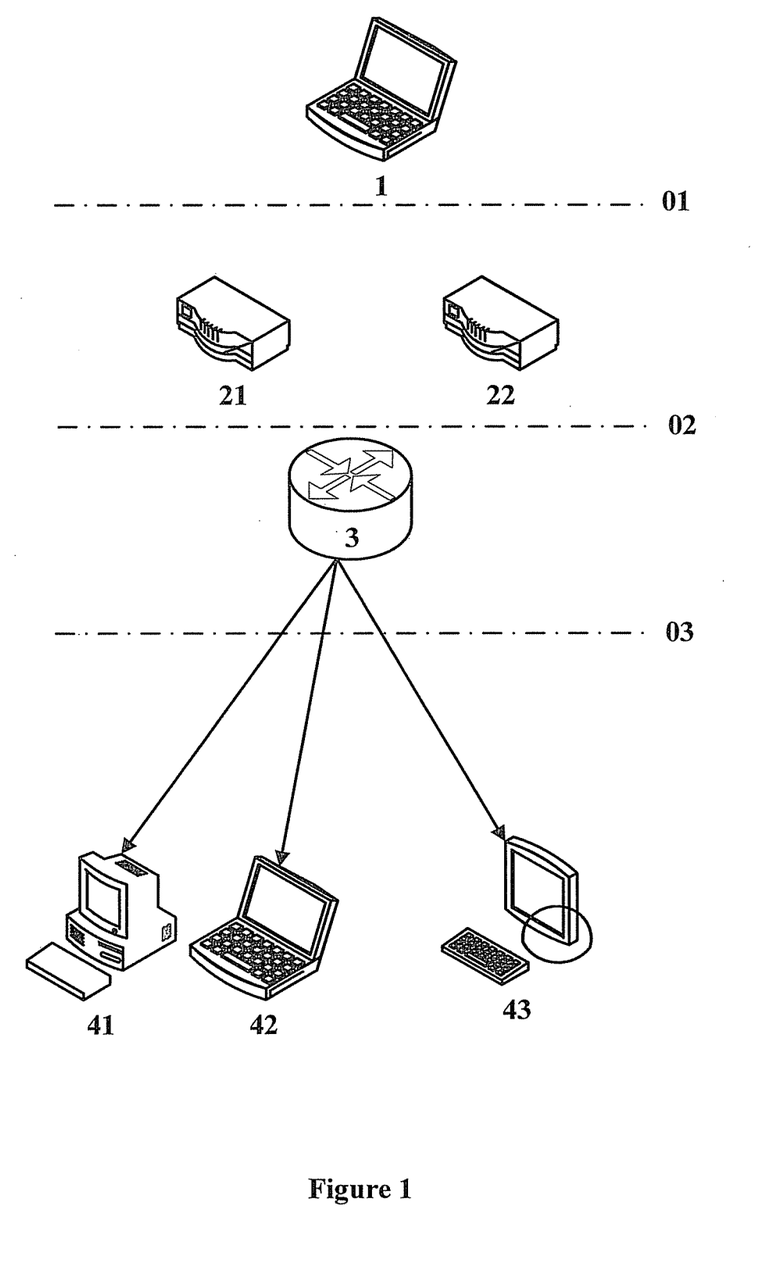
FIG. 1 is a schematic diagram of an ASM-based IP network.

FIG. 1 is a schematic diagram of an ASM-based IP network, wherein it should be understood that for the purpose of clarity only those parts relevant to the invention are shown, the omitted parts can be implemented in combination with the existing or later developed techniques by the skilled person in the art, and such omission does not affect the sufficient disclosure of the present invention. In addition, as understood by the skilled person in the art, the number of all kinds of network devices shown in the drawings is only for the purpose of meeting the requirements for the description below, and does not form any limitation to the present invention.

As shown in FIG. 1, multicast source 1 such as a laptop connects to an IP network via devices such as modems in a home network. FIG. 1 also shows two routers 21 and 22 based on PIM-SM or BIDIR-PIM protocols, which are elected in advance as the designated forwarding device DF (or forwarding router DR) of one or more multicast groups, hereinafter referred to as forwarding device 21 and forwarding device 22, respectively. If the forwarding device of multicast address D1 (belonging to multicast group G1) is forwarding device 21 and the RP corresponding to D1 is RP 3, forwarding device 21 is in charge of transmitting the multicast data and signaling that comes from its user side and points to D1 to RP 3 for further forwarding. Similarly, forwarding device 21 is also in charge of transmitting the multicast data and signaling that comes from its network side and points to D1 to each IP terminal at the user side that has joined in multicast group G1.

In order to implement the above-mentioned forwarding, according to at least one embodiment of the present invention, forwarding device 21 pre-stores the communication address of RP 3 corresponding to multicast address D1, such as a unicast IP address. When forwarding device 21 is elected as the designated forwarding device of multiple multicast groups, it preferably stores the communication addresses of the RPs corresponding to all these multicast groups. It is the same for forwarding device 22, and is therefore no more repeated here.

Wherein, the side of the forwarding device for connecting (might be indirectly) IP terminals such as multicast source 1 is herein called its user side. Conversely, the other side of the forwarding device for connecting RP (might be indirectly) is herein called its network side. Such description is only used for easier reading, but does not make any limitations to the forwarding devices based on the present invention.

In FIG. 1, for clarity, the dotted lines are used to represent connection 01 between multicast source 1 (an IP terminal) and the forwarding devices, connection 02 between the forwarding devices and RP 3, and connection 03 between RP 3 and IP terminals 41, 42 and 43. It is understood by the skilled person in the art that any omitted connection can be made up of wired, wireless links and network devices such as a router, and such omission does not affect the sufficient disclosure of the present invention. Wherein, connection 03 usually comprises forwarding devices having similar functions to forwarding device 21, 22.

Herein, a multicast transmission request initiated by multicast source 1 is mainly described. The entire procedure can be divided into two parts: transmitting a multicast transmission request, and processing a multicast transmission request. In details:

1) Transmit a Multicast Transmission Request

Figure 2A:
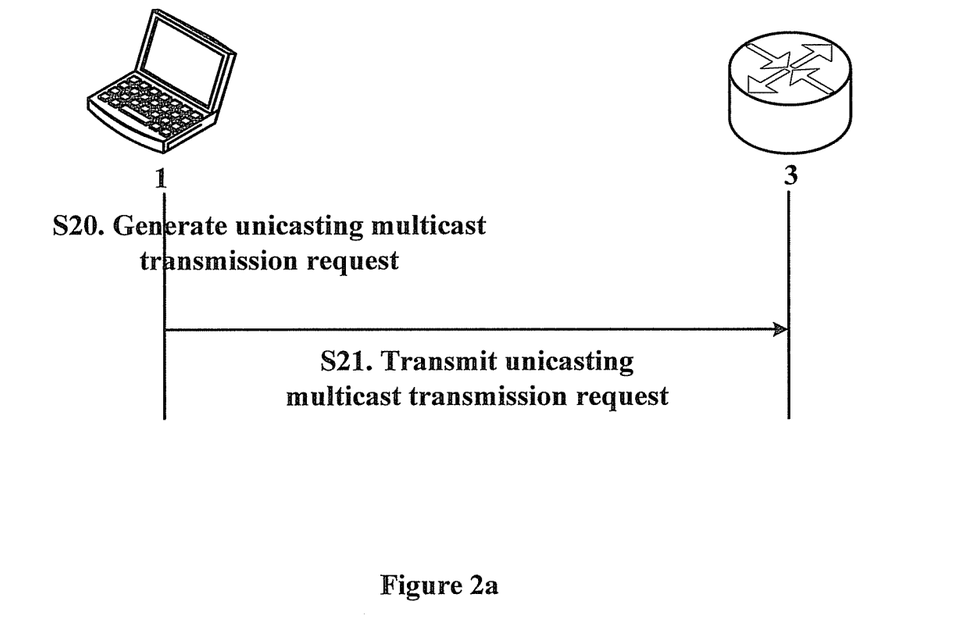
FIG. 2a is a flowchart of a method for an ASM multicast source to request to transmit multicast data according to an embodiment of the present invention.
Figure 2B:
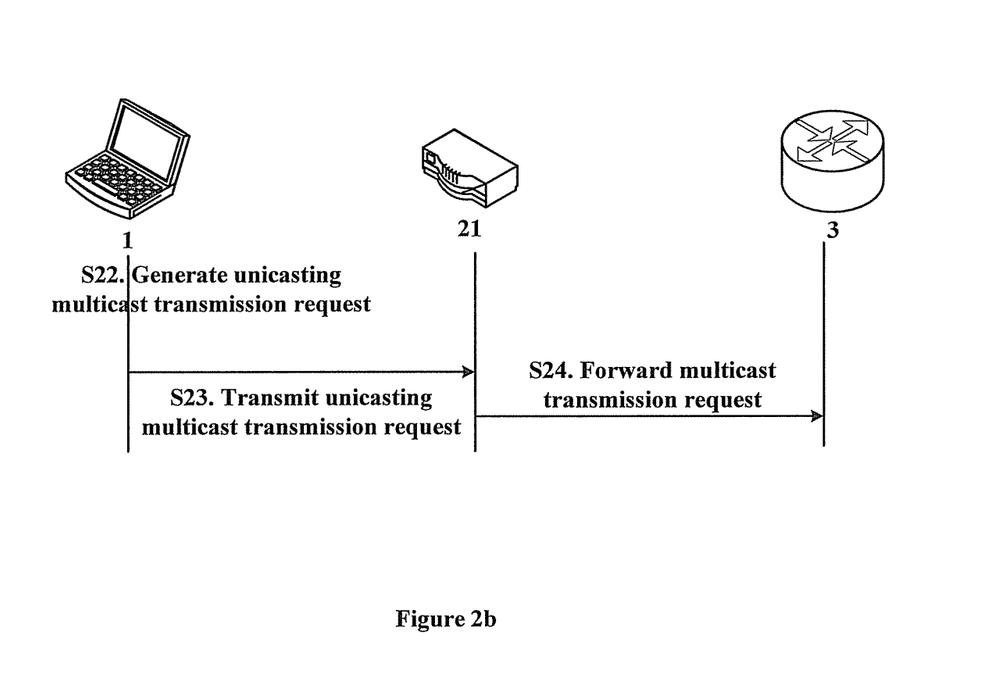
FIG. 2b is a flowchart of a method for an ASM multicast source to request to transmit multicast data according to another embodiment of the present invention.
Figure 2C:
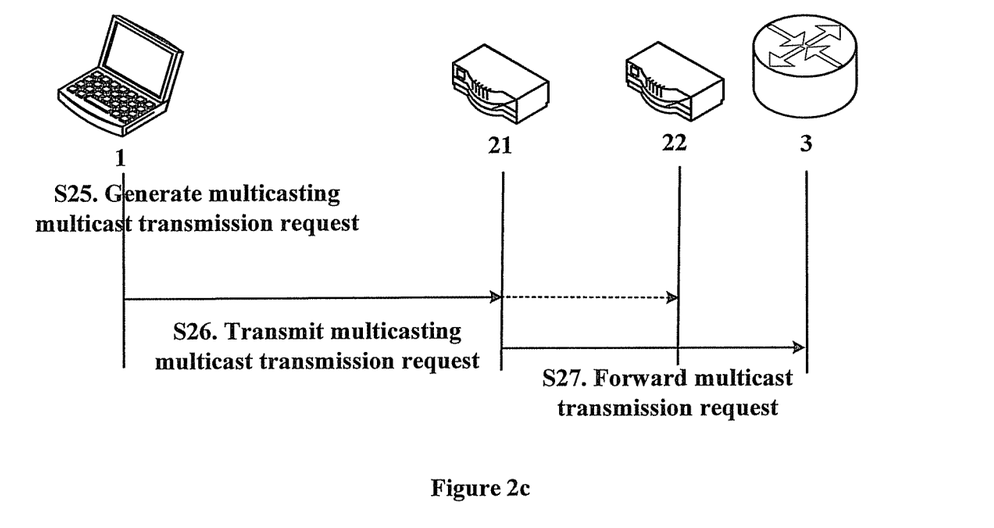
FIG. 2c is a flowchart of a method for an ASM multicast source to request to transmit multicast data according to a further embodiment of the present invention.

In the following, multicast source 1 requesting to transmit multicast data to multicast address D1 as illustrated in FIG. 1 will be taken as an example, where multicast address D1 corresponds to RP 3, or in other words RP 3 is the root node of the multicast tree of multicast group G1. Referring to FIG. 2a-2c, three ways for the multicast request transmitted by multicast source 1 to arrive at the RP are described.

1.1) Multicast Source 1 knows the IP Address of the RP Corresponding to Multicast Address D1

Referring to FIG. 2a, the user of multicast source 1, once reaching an agreement with the operator on transmitting multicast data to multicast address D1, is informed that multicast address D1 corresponds to RP 3 whose unicast IP address is A1.

Therefore, in order to request to transmit multicast data to multicast address D1, in step S20, multicast source 1 preferably generates a unicast IP packet whose destination address is the unicast IP address of RP 3. The multicast address D1 is written into a pre-defined position in the packet, representing requesting to transmit multicast data to D1. Then, the multicast transmission request is transmitted in step S21.

Thus, based on the developed routing scheme in IP protocol, the multicast transmission request arrives at RP 3 by a series of forwarding. By parsing the pre-defined position, RP 3 can know to which multicast address multicast source 1 intends to transmit multicast data.

Preferably, the multicast transmission request generated by multicast source 1 also indicates the amount of bandwidth that D1 wishes to occupy, also called the required bandwidth corresponding to multicast address D1.

It is understood by the skilled person in the art that when multicast source 1 wishes to transmit multicast data to multiple multicast addresses and if it knows the IP addresses of the corresponding RPs of all these multicast addresses, the multicast addresses corresponding to the same RP can be written into the same unicasting multicast transmission request, and each generated multicast transmission request can be transmitted to the corresponding RP. Preferably, each multicast transmission request contains the corresponding required bandwidth of the corresponding multicast address.

1.2) Multicast Source 1 does not know the RP Corresponding to Multicast Address D1, but knows that the Forwarding Device Corresponding to D1 is Forwarding Device 21.

Refer to FIG. 2b. In this case, in step S22, multicast source 1 still generates a unicasting multicast transmission request, but the destination address therein changes to the unicast address of forwarding device 21. The multicast transmission request generated is transmitted in step S23, and then arrives at forwarding device 21.

By parsing multicast address D1 in the multicast transmission request and then querying the pre-stored mapping information between multicast addresses and RPs, forwarding device 21 can accurately determine the RP corresponding to multicast address D1, namely RP 3, and request RP 3 to transmit multicast data to D1 in step S23 for multicast source 1. Without loss of generality, for example, in step S23, forwarding device 21 changes the destination address in the received multicast transmission request to the IP address of the queried RP 3, and then forwards the request whose source address is D1 to RP 3. Preferably, the forwarded multicast transmission request also indicates that the initiator of the request is multicast source 1 by, for example, writing the IP address of multicast source 1 into a pre-defined position.

Preferably, the multicast transmission request generated by multicast source 1 is also marked with the bandwidth that D1 wishes to occupy, also known as bandwidth requirement corresponding to multicast address D1.

If multicast source 1 wishes to transmit multicast data to multiple multicast address such as D1-D3, it can query the forwarding device corresponding to each of these multicast addresses, respectively, and preferably writes the multicast addresses corresponding to the same forwarding device into the same unicasting multicast transmission request to transmit it to the corresponding forwarding device. For example, D1 and D2 both correspond to forwarding device 21, and D3 corresponds to forwarding device 22, and so two unicasting multicast transmission requests are generated: the first indicates D1 and D2 and its destination address is the IP address of forwarding device 21; the second indicates D3 and its destination address is the IP address of forwarding device 22. Then, each forwarding device queries the RP corresponding to each multicast address, and preferably also puts the multicast addresses corresponding to the same RP into the same multicast transmission request to be forwarded to transmit it to the corresponding RP. Preferably, each multicast transmission request contains the required bandwidth corresponding to the corresponding multicast address.

1.3) Multicast Source 1 neither knows the RP Corresponding to Multicast Address D1, nor knows to which Forwarding Device D1 Corresponds.

Refer to FIG. 2c. In this case, multicast source 1 generates, in step S25, a multicast packet as the multicast transmission request with destination address being D1. According to the protocol of ASM such as PIM-SM or BIDIR-PIM protocols, the multicast packet with destination address being D1 that is transmitted in step S26 is routed to the designated forwarding device of multicast group G1, namely forwarding device 21. The dotted line in FIG. 2c is especially used to show that the multicast packet will not arrive at forwarding device 22.

In the next step S27, forwarding device 21 in place of multicast source 1 requests RP 3 to transmit multicast data to multicast address D1. The exact manner is, for example that at first the forwarding device 1 queries the pre-stored mapping information and finds the RP corresponding to multicast address D1, namely RP 3; then, it generates a new unicasting multicast transmission request whose destination address is the IP address of RP 3, and writes multicast address D1 into a specific field whose position and function should of course be known to each RP. Preferably, each multicast transmission request contains the corresponding required bandwidth of the corresponding multicast address.

The transmitting manner of the multicast transmission request is introduced in the above. It should be understood that in which manner the multicast transmission request is transmitted by the multicast source to the RP does not necessarily limit the scope of protection of the present invention, and the present invention emphasizes more on discussing the control and filtering of the request initiated by multicast sources conducted by RPs, which will be described in detail in the following.

Figure 3A:
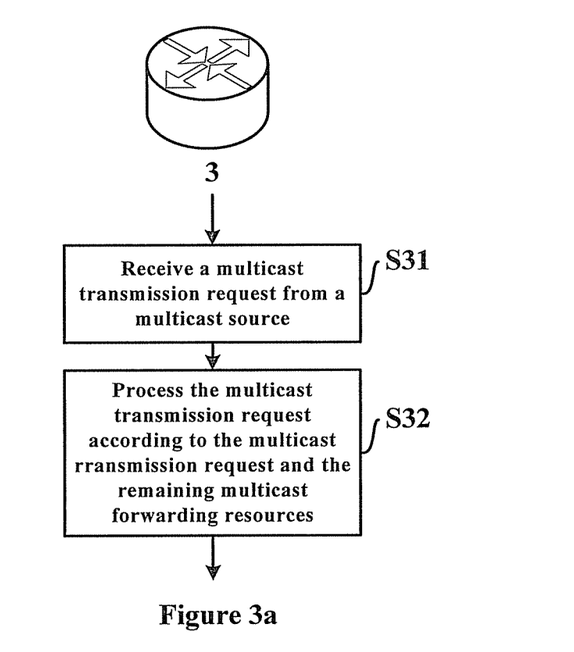
FIG. 3a is a flowchart of a method for an ASM-based RP to process multicast transmission requests according to an embodiment of the present invention.

FIG. 3a is a flowchart of a method for an ASM-based RP to process multicast transmission requests according to an embodiment of the present invention, where the method mainly includes step S31 and S32. In step S31, the RP such as RP 3 shown in FIG. 1 receives a multicast transmission request from a multicast source such as multicast source 1 shown in FIG. 1, and then in step S32, processes the multicast transmission request according to the multicast transmission request and the remaining multicast forwarding resources. Wherein, the implementation of step S31 has been described in the above, and the following mainly introduces step S32.

The implementation of step S32 does not depend on the way how the multicast transmission request arrives at RP 3, because no matter by which means, RP 3 knows which multicast source initiates the multicast transmission request, and to which multicast group it wishes to transmit multicast data.

As already mentioned in the above, each valid multicast address has a corresponding RP as the root node of the corresponding multicast tree for forwarding signaling and multicast data, and therefore, the invention preferably considers such a special case, i.e. the mapping relationship between the multicast address and the RP changes at a certain moment. For example, multicast address D5 corresponding to RP 3 is now changed to correspond to an additional RP. Although each RP knows the new mapping relationship in time, the forwarding devices or the multicast sources may have not been updated in time and thus transmit the multicast transmission request according to the originally known mapping relationship, which may result in that the multicast transmission request is transmitted to the wrong RP inappropriately. For example, a multicast transmission request which requests to transmit multicast data to D5 is still transmitted to RP 3. In this case, preferably, RP 3 returns a multicast request response to multicast source 1 (directly or forwarded by the corresponding forwarding device), which indicates that RP 3 is no longer the RP corresponding to D5, and preferably, also indicates the IP address of the additional RP, so that multicast source 1 can reinitiate another multicast transmission request.

Preferably, RP 3 can also forward the multicast transmission request to the additional RP, so as to save signaling reciprocation.

The following will focus on the cases that the multicast transmission request is transmitted to the correct RP. The several implementations of step S32 illustrated in FIG. 3b-3e are discussed as follows.

Consider the Remaining Total Bandwidth Available for Multicast Data Forwarding

Figure 3B:
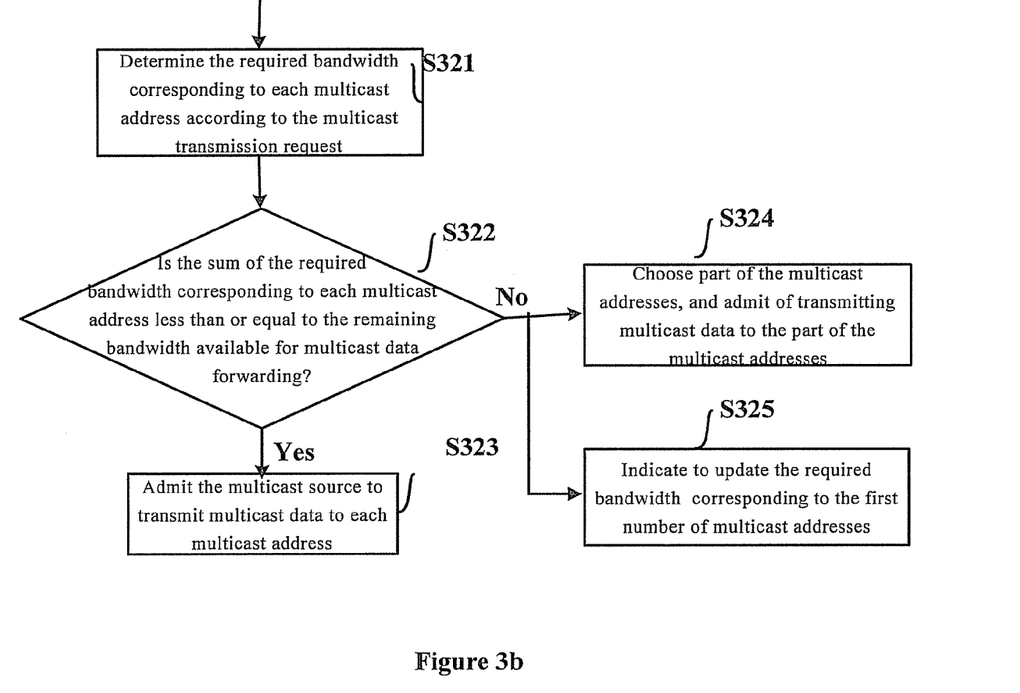
FIG. 3b is a detailed flowchart of step S32 illustrated in FIG. 3a according to an embodiment of the present invention.

As a principle in this case, all multicast addresses corresponding to RP 3 share the bandwidth available for multicast data forwarding in RP 3, and no corresponding upper limit of the bandwidth for multicast forwarding is individually set for each multicast address. In other words, there may be such a case in which RP 3 corresponds to D1 and D2, where, the bandwidth available for multicast data forwarding by RP 3 is completely occupied by the multicast services of D1.

Refer to FIG. 3b in combine with FIG. 1 and FIG. 2. Wherein, in step S321, RP 3 firstly determines the required bandwidth corresponding to each multicast address according to the multicast transmission request. As already mentioned in the above, multicast source 1 can write the required bandwidth corresponding to each multicast address into the multicast transmission request, so that RP 3 can obtain the required bandwidth in step S321, and can thereby know the amount of bandwidth which multicast source 1 wishes to use for transmitting multicast data to multicast address D1. In this case, assume that multicast source 1 wishes to use 150 kbps for transmitting multicast data to D1.

Then, in next step S322, RP 3 decides whether the remaining bandwidth available for multicast data forwarding can meet the request of multicast source 1. For example, the total bandwidth at the port of RP 3 for forwarding data is 10 Mbps, among which 1 Mbps is for multicast data forwarding. Thus, RP 3 decides whether the required bandwidth of 150 kbps is less than or equal to the remaining of such 1 Mbps, based on which the decision in step S322 is obtained.

Assume that there is already 800 kbps being used for multicast data forwarding in the above-mentioned 1 Mbps, namely that 200 kbps remains. Because 150 kbps is less than 200 kbps, a positive decision is obtained in step S322. Then, it goes to step S323, where multicast source 1 is admitted by RP 3 to transmit multicast data to multicast address D1.

Step S323 can be implemented in many ways. Without loss of generality, RP 3 generates a multicast request response which indicates that multicast source 1 can transmit multicast data to multicast address D1, and furthermore, RP 3 also updates its pre-stored list of active multicast sources, so as to add multicast source 1 as an authorized multicast source or an active multicast source corresponding to multicast address D1, and preferably make the 150 kbps bandwidth information as an attribution information of multicast address D1 for multicast source 1.

Consequently, the remaining bandwidth available for multicast forwarding at RP 3 is only 50 kbps (200 kbps-150 kbps). If there is new multicast transmission request, 50 kbps will be used to compare with the corresponding required bandwidth (refer to the description for S322 in the above).

Operations after multicast source 1 obtains the admission of RP 3 have been clearly described in detail in current multicast protocols, and will not be elaborated herein.

If the required bandwidth corresponding to D1 requested by multicast source 1 exceeds the remaining bandwidth available for multicast forwarding at RP 3 and is, for example, 300 kbps, the succeeding operations of RP 3 is various, including but not limited to that: RP 3 simply rejects the multicast transmission request and does not provide multicast source 1 with other information; RP 3 indicates multicast source 1 to update the required bandwidth corresponding to D1 to initiate a new multicast transmission request; RP 3 suggests a new appropriate required bandwidth for multicast source 1, so as to basically guarantee that when multicast source 1 uses the suggested required bandwidth to initiate a new multicast transmission request, it can obtain the admission from RP 3.

Referring to FIG. 3*b*, step S325 is more suitable to the case that multicast source 1 initiates the request for only one multicast address. For instance, according to the remaining bandwidth for multicast forwarding of 200 kbps, RP 3 generates a multicast request response, which is used to provide multicast source 1 with such an indication: taking 150 kbps as the new required bandwidth, reinitiating the multicast transmission request. Optionally, RP 3 can record this temporarily unsuccessful request, and give multicast source 1 a certain period of time to initiate a new request. For the convenience of understanding, the time period can be called "grace period", within which multicast requests coming from other multicast sources will be delayed for processing, whereas the new multicast transmission request coming from multicast source 1 can enjoy higher priority. Once the grace period expires, the multicast transmission request from other multicast sources will be treated equally to the request from multicast source 1. In this case, the first number marked in step S325 is 1.

Consider the case in FIG. 3*b* where multicast source 1 initiates a multicast transmission request for multiple multicast addresses, for example, D1 and D2. In step S322, RP 322 gets a sum by adding up the corresponding required bandwidth of each multicast address and compares the sum with the remaining bandwidth available for multicast data forwarding such as 200 kbps. If the former is less than or equal to the later, it goes to step S323 to admit this request of multicast source 1. Conversely, if this sum is greater than 200 kbps, step S324 and step S325 are both good choices and will be respectively introduced as follows:

Step S324: Suppose that the corresponding bandwidth requirements of D1 and D2 are both 150 kbps. Thus, RP 3 chooses any one from them, such as multicast address D1, and admits multicast source 1 to transmit multicast data to D1. In particular, for example, RP 3 transmits a multicast request response to multicast source 1 to inform that the request of multicast address D1 is admitted, and updates the table of active multicast sources pre-stored by itself by adding multicast source 1 as an active multicast source corresponding to D1 and preferably making 150 kbps as an item of the table related to multicast source 1 and D1. The bandwidth values written into such table can be used as an important basis for RP 3 to calculate the remaining bandwidth for multicast data forwarding. If RP 3 is only responsible for multicast data forwarding, it can also know how much remaining bandwidth is available by monitoring the traffic at its corresponding port, and consequently, does not need to look it up in such table of active multicast sources.

Step S325: As an alternative to step S324, when the total required bandwidth exceeds the remaining bandwidth available for multicast data forwarding, RP 3 can indicate multicast source 1 to update the required bandwidth for the first number of these two multicast address D1, D2. In this case, the first number has a value of 1 or 2. The details can be referred to the introduction in the above, and therefore no more descriptions here.

According to a variety of the above example, the multicast transmission request does not contain required bandwidth corresponding to each multicast address. Thus, RP 3 estimates the bandwidth that will be occupied by the multicast transmission which multicast source 1 wishes to initiate, according to the address segment in which the multicast address is located. Certainly, it depends on the relationship between address segments and multicast services. Alternatively, if there is no relationship between address segments and multicast service types, an appropriate estimated bandwidth B can be configured for RP 3. When any multicast source requests to transmit multicast data to any multicast address, RP 3 always regards the bandwidth to be consumed as B, so as to assist the decision in the following step S322.

For the above-mentioned table of active multicast sources, a time threshold is preferably set in the present invention, functioning for example as: assuming that multicast source 1 is an active multicast source corresponding to D1, RP 3 starts a timer after the last time it receives a multicast packet transmitted to D1 from multicast source 1; if within the time threshold the multicast packet from multicast source 1 to D1 is no longer received; multicast source 1 will be determined not to be the corresponding active multicast source of D1 any more and RP 3 will delete multicast source 1 from the active multicast sources corresponding to D1; preferably, if multicast source 1 has also been the active multicast source corresponding to other multicast addresses, RP 3 will not delete multicast source 1 from the active multicast sources corresponding to the other multicast addresses due to the timeout at D1.

Figure 3C:
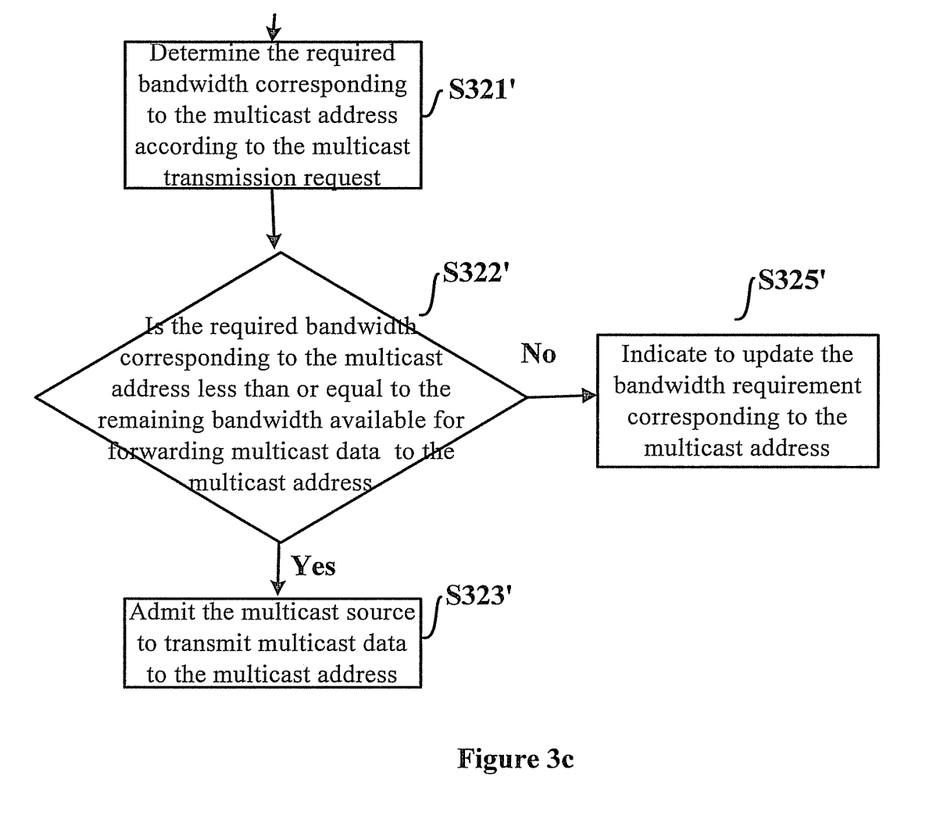
FIG. 3c is a detailed flowchart of step S32 illustrated FIG. 3a according to another embodiment of the present invention.

Consider the Remaining Bandwidth that can be Used for Multicast Data Forwarding to each Multicast Address Referring to FIG. 3*c*, one major difference from the case shown in FIG. 3*b* lies in that, at RP 3, the upper limit of bandwidth available for forwarding multicast data to the corresponding multicast address is set for each of the multicast addresses corresponding to RP 3, respectively. Typically, assume that 1 Mbps in the total 10 Mbps bandwidth is available for multicast data forwarding, and 300 kbps therein is allocated to multicast address D1 whereas 700 kbps remains. Certainly, if there are other multicast addresses corresponding to RP 3, the allocation of the 1 Mbps bandwidth could be different.

Thus, multicast addresses D1 and D2 will no longer share the total 1 Mbps multicast bandwidth dynamically. When the service requirement pointing to multicast address D1 increases suddenly, it may happen that the required bandwidth corresponding to multicast address D1 exceeds 300 kbps, but at this time, according to the rules in this case, RP 3 will not give part of the 700 kbps bandwidth that is pre-allocated to D2 to D1, even if there were some unoccupied left.

Based on the above principle, assume that at RP 3, 100 kbps out of the 300 kbps bandwidth of D1 remains, and 600 kbps out of the 700 kbps bandwidth of D2 remains. The flowchart shown in FIG. 3*c* is executed for each of multicast addresses requested by multicast source 1. Taking multicast address D as an example, in step S321, RP 3 extracts the required bandwidth corresponding to D1 from the multicast transmission request message, such as 150 kbps.

Since the required bandwidth 150 kbps is greater than the remaining bandwidth 100 kbps available for forwarding multicast data to D1, in step S322' the negative decision is obtained and thus it enters into step S325', which indicates to update the required bandwidth corresponding to multicast address D1. The detailed procedure can be referred to the content of the aforementioned step S325.

Conversely, if the required bandwidth corresponding to D1 is less than or equal to the remaining bandwidth available for forwarding multicast data to D1, RP 3 will admit multicast source 1 to transmit multicast data to D1 and update its pre-stored table of active multicast sources, and preferably, make the corresponding required bandwidth as an item related to both multicast source 1 and D1 in the table.

Figure 3D:
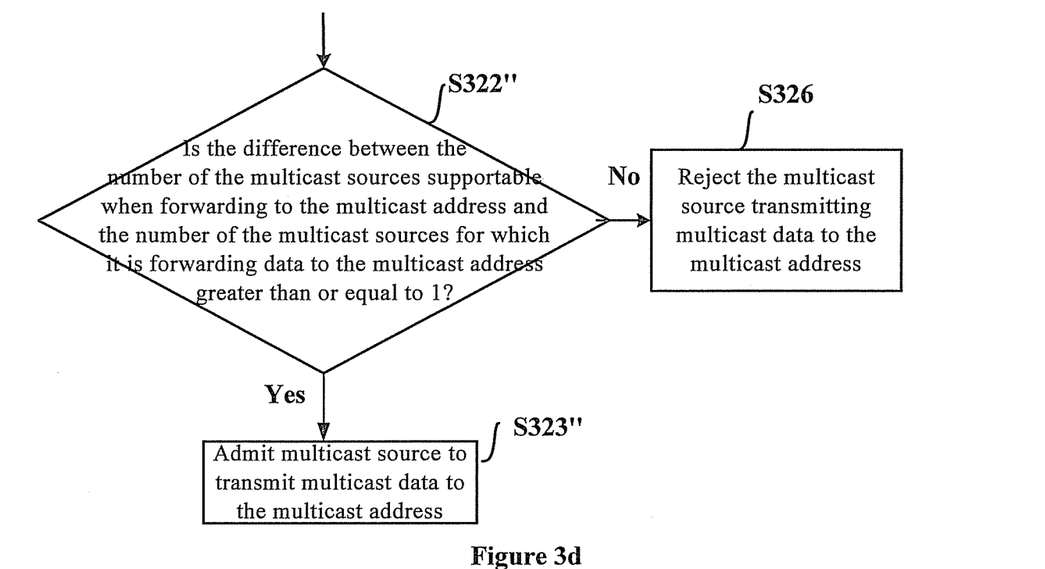
FIG. 3d is a detailed flowchart of step S32 illustrated in FIG. 3a according to a further embodiment of the present invention.

Consider the Number of Supportable Multicast Sources when Forwarding Multicast Data to a Specific Multicast Address Referring to FIG. 3d, different from FIG. 3b-3c, in this case the number of multicast sources is used as the restrictive condition for deciding whether the multicast transmission request of multicast source 1 is admitted or not. In details:

At RP 3, an upper limit number of multicast sources is set for each corresponding multicast address (such as D1 and D2). For example, RP 3 forwards multicast data for at most 3 multicast sources to D1 and for at most 5 multicast sources to D2. When receiving a multicast transmission request from multicast source 1 requesting to transmit multicast data to D1, RP 3 looks up the table of active multicast sources that is pre-stored and continuously updated, and decides whether the difference between the number of multicast sources (i.e. 3) supportable for forwarding to D1 and the number of multicast sources for which RP 3 are currently forwarding multicast data to D1 is greater than or equal to 1, and accordingly obtains the decision of step S322'.

As it can be seen, when RP 3 has been forwarding multicast data to multicast address D1 for 3 multicast sources, this method enters into step S326 and transmitting multicast data from multicast source 1 to multicast address D1 is rejected. Conversely, S323" is entered and the request is admitted, and the table of active multicast sources is updated accordingly. In this case, since bandwidth is not a necessary restrictive condition, the items related to bandwidth need not to be included in the table of active multicast sources.

Preferably, there may be an implicit assumption that the bandwidth used by each multicast source should not exceed a setting value. In this manner, when the number of multicast sources reaches the upper limit, the bandwidth occupied will not exceed the upper limit of multicast bandwidth that RP can provide.

Figure 3E:
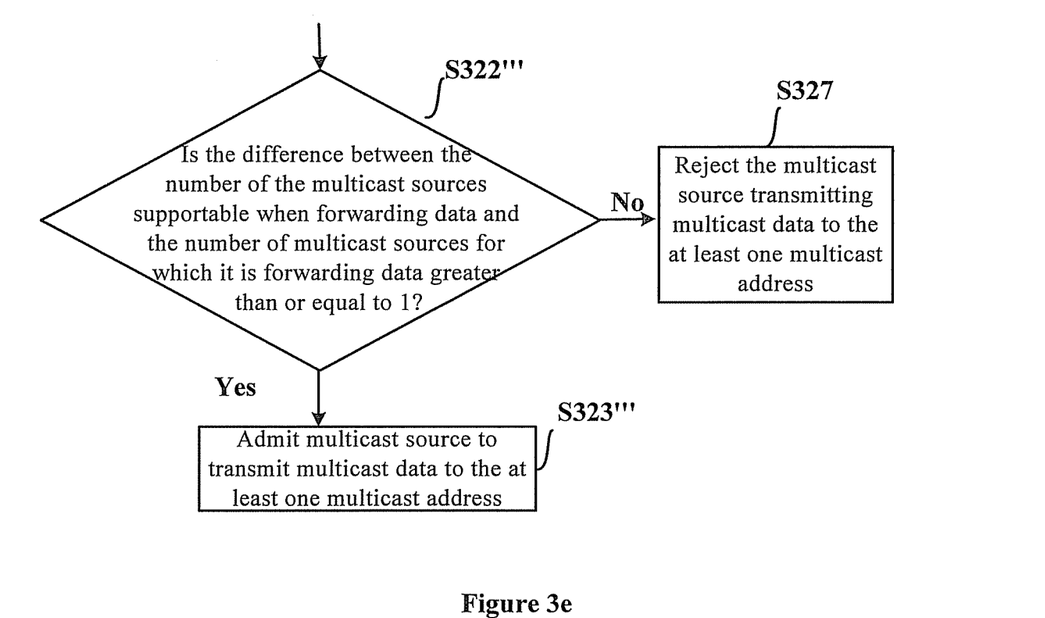
FIG. 3e is a detailed flowchart of step S32 illustrated FIG. 3a according to a further embodiment of the present invention.

Consider the Supportable Total Number of Multicast Sources when Forwarding Multicast Data to each Multicast Address Referring to FIG. 3e, assume that the multicast addresses corresponding to RP 3 comprise D1 and D2, and use the total number of multicast sources for which RP 3 can forward multicast data as a restrictive condition.

Particularly, assume that RP 3 can forward multicast data for at most 10 multicast sources, and is already forwarding data to D1 for 3 multicast sources and to D2 for 6 multicast sources. In step S322''', RP 3 decides whether the difference between the total number of the multicast sources supportable when forwarding data and the number of multicast sources for which it is forwarding data is greater than or equal to 1. When a positive decision is obtained, it enters into step S323''' to admit multicast source 1 to transmit multicast data to the requested multicast address.

Conversely, if RP 3 is forwarding multicast data to 10 multicast sources at this moment, a negative decision is obtained in step S322''', and therefore S327 is entered, which rejects multicast 1 transmitting multicast data to the requested multicast address.

In the above example, it can be considered that no matter how many multicast addresses to which multicast source 1 requests to transmit multicast data, all are treated as one multicast source. Thus, when the difference obtained in step S322''' is 1, the request will be admitted even if multicast source 1 requests to transmit separately to D1 and D2.

In a variety of the above example, when a multicast source requests to transmit multicast data to different multicast addresses, it will be regarded as multiple multicast sources for processing. Particularly, take the example that multicast source 1 requests to transmit multicast data to multicast addresses D1 and D2. Considering that the upper limit of total multicast sources is 10 and the number of multicast sources for which RP 3 is forwarding is 9, RP 3 will support at most one new multicast source. Thus, as an alternative of step S327 illustrated in FIG. 3e, RP 3 can indicate multicast source 1 to choose one from D1 and D2 and reinitiate a multicast transmission request. Or, RP 3 directly chooses one from them, informs multicast source 1 about the choice by means of sending a multicast request response, and updates the table of active multicast sources. Similar to the example in FIG. 3d, the bandwidth related item does not have to be included in the table of active multicast sources. Optionally, if multicast source 1 requests to respectively transmit multicast data to D1 and D2 and RP 3 is currently forwarding multicast data for 3 multicast sources, multicast source 1 is admitted to transmit to D1 and D2 in step S323'''. Furthermore, later when the active multicast table is updated, multicast source 1 will appear in the parts of the table corresponding to D1 and D2, respectively, and when a new multicast transmission request comes, multicast source 1 will be regarded as two multicast sources for which RP 3 forwards multicast data.

Preferably, there may be also an implicit presumption for this method, i.e. the bandwidth used by each multicast source does not exceed a setting value. Thus, when the number of the multicast sources corresponding to each multicast address reaches the upper limit, the total bandwidth occupied will not exceed the upper limit of the multicast bandwidth that the RP can provide.

The present invention has been described in detail in combination with the flowchart of methods, and in the following, the apparatuses will be introduced in combination with block diagrams of apparatuses. It should be understood that the related content in the above can be used as reference here.

Figure 4A:
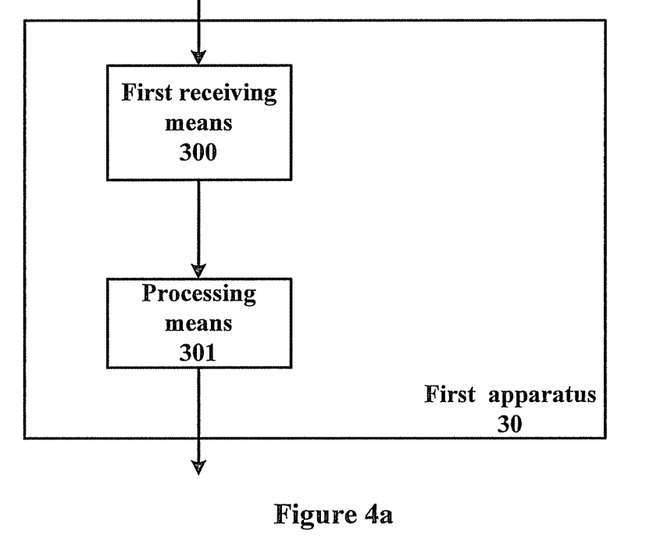
FIG. 4a is a block diagram of a first apparatus in an ASM-based RP for processing multicast transmission requests according to an embodiment of the present invention.

FIG. 4a shows the block diagram of a first apparatus in an RP for processing multicast transmission requests according to an embodiment of the present invention, where first receiving means 300 and process means 301 are comprised. The former is in charge of receiving the multicast transmission requests from multicast sources or forwarding devices in steps S21, S24 or S27 as illustrated in FIG. 2a-2c, and forwarding them to process means 301.

Figure 4B:
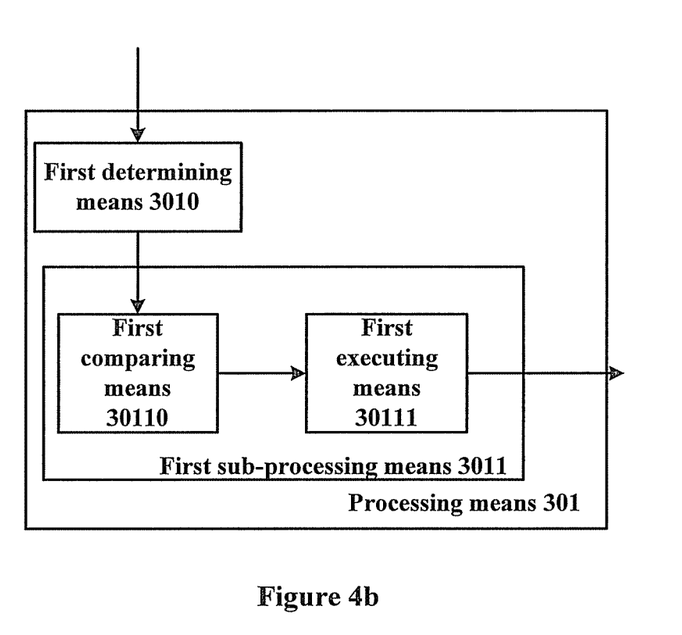
FIG. 4b is an internal block diagram of the processing means of FIG. 4a according to an embodiment of the present invention.

Process means 301 in first apparatus 30, according to the discussion about step S32 in combined with FIGS. 3b-3e, can be implemented in four ways as shown in 4b-4e. According to the amount of applicable scenarios required, first apparatus 30 can be configured with one or more means/modules in FIG. 4b-4e. It should be understood that, when being configured with the multiple means/modules illustrated in the accompanying drawings, the means/modules for implementing the same or similar functions, including but not limited to first determining means 3010 and second determining means 3012, first comparing means 30110 and second comparing means 3013 and first executing means 30111 and second executing means 3014, can be implemented by the same means/module. In details:

Refer to FIG. 4b which comprises first determining means 3010 for executing step S321 shown in FIG. 3b according to the multicast transmission request received by first receiving means 300. First sub-processing means 3011, based on the determining result of first determining means 3010 and the remaining bandwidth available for multicast data forwarding at the RP, processes the multicast transmission request of the multicast source. Its function is realized by first comparing means 30110 for executing step S322 shown in FIG. 3b and first executing means 30111 for executing step S323-S325 shown in FIG. 3b.

Figure 4C:
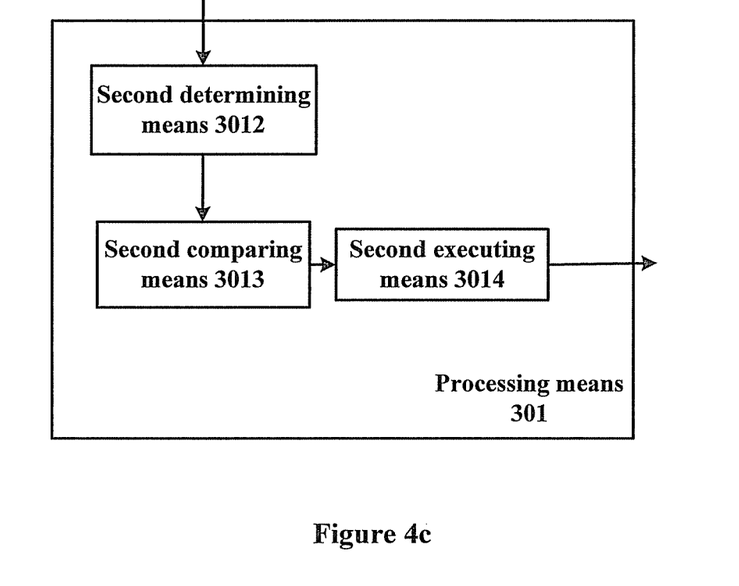
FIG. 4c is an internal block diagram of the processing means of FIG. 4a according to another embodiment of the present invention.

Refer to FIG. 4c, wherein, processing means 301 comprises second determining means 3012 for executing step S321' shown in FIG. 3c. The determining result is provided to second comparing means 3013, which executes the succeeding step S322', and the comparing result is provide to second executing means 3014 to execute step S323' or S325'. Any variety described for step S325' can also be realized by second executing means 3014.

Figure 4D:
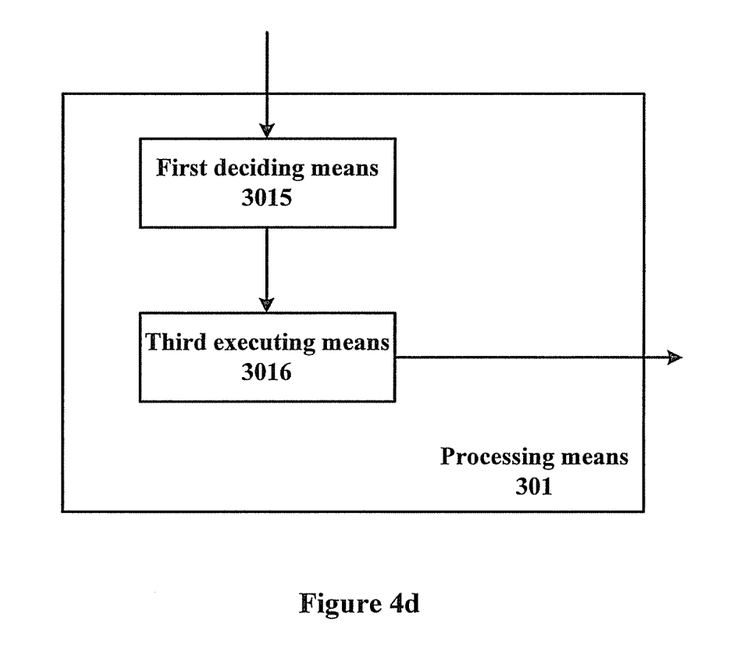
FIG. 4d is an internal block diagram of the processing means of FIG. 4a according to a further embodiment of the present invention.

Refer to FIG. 4d, wherein processing means 301 comprises first deciding means 3015 for executing step S322' shown in FIG. 3d, and third executing means 3016 for executing step S323" and step S326.

Figure 4E:
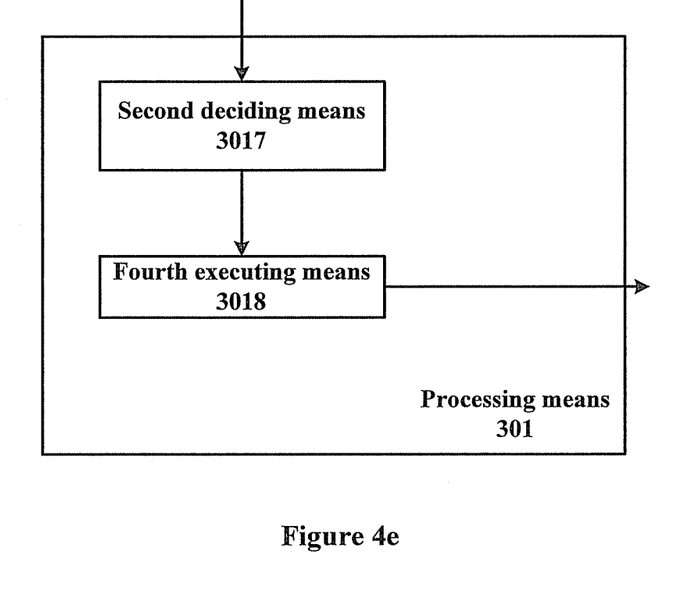
FIG. 4e is an internal block diagram of the processing means of FIG. 4a according to a further embodiment of the present invention.

Refer to FIG. 4e, wherein processing means 301 comprises second deciding means 3017 for executing step S322'" shown in FIG. 3e, and fourth executing means 3018 for executing step S323'" and step S327 in FIG. 3e.

Figure 5:
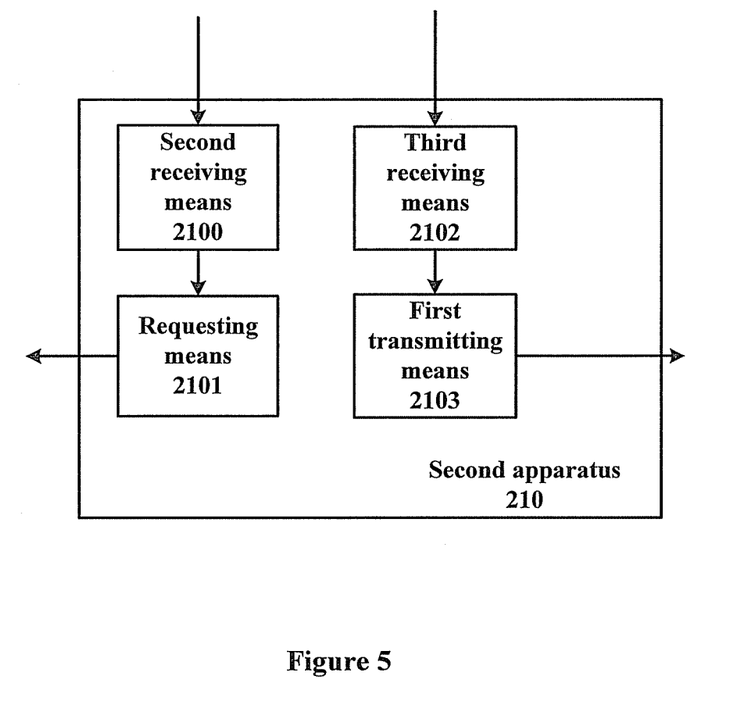
FIG. 5 is a block diagram of a second apparatus in an ASM-based forwarding device ASM for assisting interactions between a RP and a multicast source according to an embodiment of the present invention.

FIG. 5 shows the block diagram of the second apparatus in forwarding device, for assisting the interactions between the RP and the multicast source, according to an embodiment of the present invention. Take forwarding device 21 in FIG. 1 as an example, the illustrated second apparatus 210 comprises:

second receiving means 2100, for receiving multicast transmission request from a multicast source indicating at least one multicast address, namely receiving the multicast transmission request transmitted in step S23 illustrated in FIG. 2b and in step S26 illustrated in FIG. 2c;

requesting means 2101, for requesting, for each of the at least one multicast address, the RP corresponding to the multicast address to transmit multicast data to the multicast address in place of the multicast source, namely executing step S24 in FIG. 2b and step S27 in FIG. 2c;

third receiving means 2102, for respectively receiving the multicast request response transmitted by each RP corresponding to each multicast address, which is used to respond the request that is generated by the forwarding device in place of the multicast source;

first transmitting means 2103, for transmitting the received multicast request response to the corresponding multicast source.

Figure 6A:
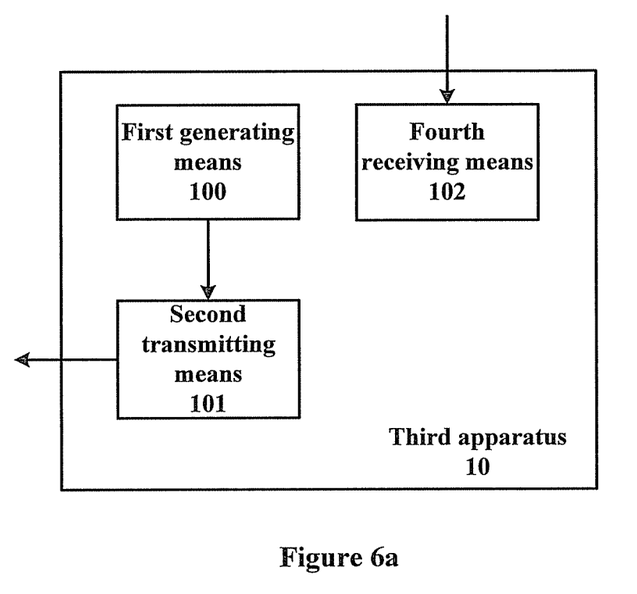
FIG. 6a is a block diagram of a third apparatus in an ASM-based multicast source for requesting to transmit multicast data according to an embodiment of the present invention.
Figure 6B:
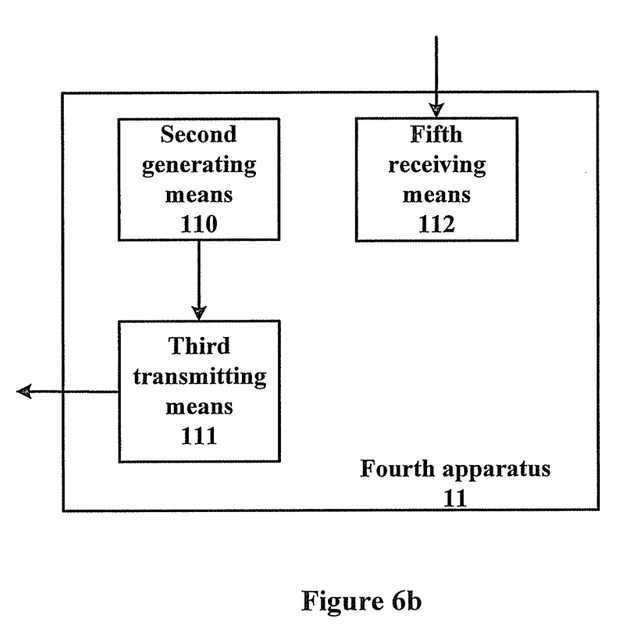
FIG. 6b is a block diagram of a fourth apparatus in an ASM-based multicast source for requesting to transmit multicast data according to an embodiment of the present invention.

FIGS. 6a and 6b respectively show the third and the fourth apparatus in the multicast source, for requesting to transmit multicast data, according to different embodiments of the present invention. FIG. 6a corresponds to the aforementioned scenarios 1.1) and 1.2), whilst FIG. 6b corresponds to the aforementioned scenario 1.3). According to the amount of applicable scenarios required, a multicast source can be configured with one or more means/modules in FIG. 6a, 6b. It should be understood that, when being configured with multiple means/modules shown in the accompanying drawings, the means/modules for implementing the same or similar functions, including but not limited to first generating means 100 and second generating means 110, can be implemented by the same means/module.

Particularly, the illustrated third apparatus 10 comprises: first generating means 100, for generating a unicasting multicast transmission request which indicates at least one multicast address; second transmitting means 101, for transmitting the multicast transmission request to the corresponding forwarding device or RP of the at least one multicast address.

Preferably, it also comprises fourth receiving means 102, for receiving a multicast request response which indicates whether the multicast source can transmit multicast data to the at least one multicast address, respectively.

Fourth apparatus 11 illustrated comprises: second generating means 110, for generating a multicasting multicast transmission request which indicates a multicast address and represents that the multicast source requests to transmit multicast data to the multicast address; third transmitting means 111, for transmitting the multicasting multicast transmission request to the multicast address; and fifth receiving means 112, for receiving a multicast request response which indicates whether the multicast source can transmit multicast data to the multicast address.

It needs to be understood that, the present invention is not limited to the above specific embodiments, and any alternation or modification can be made by those skilled in the art without departing from the scope as defined by the appended claims.

The invention claimed is:

1. A method, executed at an Any Source Multicast ASM-based Rendezvous Point RP, for processing a multicast transmission request of a multicast source, wherein, said method comprises:
   a. receiving, at the RP, the multicast transmission request from said multicast source, for requesting to transmit multicast data to at least one multicast address;
   b. processing, at the RP, said multicast transmission request of the multicast source, according to said multicast transmission request and remaining multicast forwarding resources in said RP, the remaining multicast forwarding resources being determined by analyzing, at the RP, an amount of remaining bandwidth available for multicast data forwarding at the RP.

2. A method according to claim 1, wherein, the remaining multicast forwarding resources in the RP comprise remaining bandwidth available for multicast data forwarding in the RP, and said step b comprises:
   b1. determining required bandwidth corresponding to each said multicast address, according to said multicast transmission request; and
   b2. processing said multicast transmission request of the multicast source, based on the required bandwidth corresponding to each said multicast address and the remaining bandwidth available for multicast data forwarding in the RP.

3. A method according to claim 2, wherein, said multicast transmission request indicates the required bandwidth corresponding to said each multicast address, and said step b1 comprises:
   obtaining the required bandwidth corresponding to said each multicast address from said multicast transmission request.

4. A method according to claim 2, wherein, said step b2 comprises:
   comparing a sum of the required bandwidth corresponding to each said multicast address with the remaining bandwidth available for multicast data forwarding in the RP; and
   admitting the multicast source to transmit multicast data to each said multicast address, when the sum of the required bandwidth corresponding to each said multicast address is less than or equal to the remaining bandwidth available for multicast data forwarding.

5. A method according to claim 4, wherein, said step b2 further comprises:
when the sum of the required bandwidth corresponding to each said multicast address is greater than the remaining bandwidth available for multicast data forwarding in said RP, executing any one of the following steps:
choosing part of multicast addresses from all said multicast addresses, where the sum of the required bandwidth corresponding to said part of multicast addresses is less than or equal to the remaining bandwidth available for multicast data forwarding in said RP, and admitting the multicast source to transmit multicast data to the part of multicast addresses; and
indicating said multicast source to update the corresponding required bandwidth for a first number of multicast addresses of said at least one multicast address.

6. A method according to claim 1, wherein, the remaining multicast forwarding resources in said RP comprises the remaining bandwidth available for forwarding multicast data to each multicast address in the RP, and said step b comprises, for each of said at least one multicast address, executing the following operations:
b1'. determining required bandwidth corresponding to the multicast address;
b2'. comparing the required bandwidth corresponding to the multicast source with the remaining bandwidth available for forwarding multicast data to the multicast address in said RP; and
b3'. admitting the multicast source to transmit multicast data to the multicast address, when the required bandwidth corresponding to the multicast address is less than or equal to the remaining bandwidth available for forwarding multicast data to the multicast address in said RP.

7. A method according to claim 1, wherein, the remaining multicast forwarding resources in said RP comprises, for each multicast address, a difference between the number of multicast sources supportable when the RP forwards multicast data to the multicast address and the number of multicast sources for which the RP is forwarding multicast data to the multicast address, and said step b comprises: for each of said at least one multicast address, executing the following operations:
deciding whether the difference between the number of multicast sources supportable when the RP forwards multicast data to the multicast address and the number of the multicast sources for which the RP is forwarding multicast data to the multicast address is greater than or equal to 1; and
admitting said multicast source to transmit multicast data to the multicast address, if the difference between the number of multicast sources supportable when the RP forwards multicast data to the multicast address and the number of multicast sources for which the RP is forwarding multicast data to the multicast address is greater than or equal to 1.

8. A method according to claim 1, wherein, the remaining multicast forwarding resources in said RP comprises a difference between the total number of multicast sources supportable when the RP forwards multicast data and the number of multicast sources for which the RP is forwarding multicast data, and said step b comprises:
deciding whether said difference is greater than or equal to 1; and
admitting said multicast source to transmit multicast data to said at least one multicast address, if said difference is greater than or equal to 1.

9. A method, in an Any Source Multicast ASM-based multicast source, for requesting to transmit multicast data, wherein, said method comprises:
generating a unicasting multicast transmission request which indicates at least one multicast address;
transmitting said multicast transmission request to a Rendezvous Point RP corresponding to said at least one multicast address; and
receiving, at the ASM-based multicast source, a multicast request response from the RP, the multicast request response indicating whether the multicast source can transmit multicast data to said at least one multicast address, the response generated based on said multicast transmission request and remaining multicast forwarding resources in said RP.

10. A method, in an Any Source Multicast ASM-based multicast source, for requesting to transmit multicast data, wherein, said method comprises:
generating a multicasting multicast transmission request which indicates a multicast address, representing that the multicast source requests to transmit multicast data to the multicast address;
transmitting the multicasting multicast transmission request to a Rendezvous Point RP corresponding to the multicast address; and
receiving, at the ASM-based multicast source, a multicast request response from the RP, the multicast request response indicating whether the multicast source can transmit multicast data to said multicast address, the response generated based on said multicast transmission request and remaining multicast forwarding resources in said RP.

11. A apparatus in an Any Source Multicast ASM-based multicast Rendezvous Point RP for processing a multicast transmission request of a multicast source, wherein, said first apparatus comprises:
a first receiving means, located at the RP, for receiving the multicast transmission request from said multicast source, for requesting to transmit multicast data to at least one multicast address; and
a processing means, located at the RP, for processing said multicast transmission request of the multicast source, according to said multicast transmission request and remaining multicast forwarding resources in said RP, the remaining multicast forwarding resources being determined by analyzing, at the RP, an amount of remaining bandwidth available for multicast data forwarding at the RP.

12. A apparatus in an Any Source Multicast ASM-based multicast source, for requesting to transmit multicast data, wherein, said apparatus comprises:
a generating means, for generating a unicasting multicast transmission request, which indicates at least one multicast address;
a transmitting means, for transmitting said multicast transmission request to a Rendezvous Point RP corresponding to said at least one multicast address; and
receiving means for receiving a multicast request response from the RP, the multicast request response indicating whether the multicast source can transmit multicast data to said at least one multicast address, the response generated based on said multicast transmission request and remaining multicast forwarding resources in said RP.

13. A apparatus in an Any Source Multicast ASM-based multicast source, for requesting to transmit multicast data, wherein, said fourth apparatus comprises:

a generating means, for generating a multicasting multicast transmission request which indicates a multicast address, representing that the multicast source requests to transmit multicast data to the multicast address;

a transmitting means, for transmitting the multicast request of multicast to the multicast address, the multicast address being an address of a Rendezvous Point RP; and receiving means for receiving at the multicast source, a multicast request response from the RP, the multicast request response indicating whether the multicast source can transmit multicast data to said multicast address, the response generated based on said multicast transmission request and remaining multicast forwarding resources in said RP.

* * * * *